United States Patent [19]

Osborn

[11] 4,383,716
[45] May 17, 1983

[54] WHEEL TRIM RETENTION SYSTEM
[75] Inventor: Doyle L. Osborn, Westland, Mich.
[73] Assignee: NI Industries Inc., Novi, Mich.
[21] Appl. No.: 201,566
[22] Filed: Oct. 28, 1980

Related U.S. Application Data

[63] Continuation of Ser. No. 25,324, Mar. 30, 1979, abandoned.

[51] Int. Cl.³ ............................................... B60B 7/00
[52] U.S. Cl. .................................. 301/37 R; 301/37 P; 24/295
[58] Field of Search ................. 301/37 R, 37 P, 37 C, 301/108 R; 24/293, 295

[56] References Cited

U.S. PATENT DOCUMENTS

| | | | |
|---|---|---|---|
| 2,761,188 | 9/1956 | Bedford | 301/37 CD |
| 2,817,132 | 12/1957 | Petri | 24/73 B |
| 3,771,834 | 11/1973 | Kretschmer | |
| 3,788,707 | 1/1974 | Connell | |
| 3,794,385 | 2/1974 | Kretschmer | 301/37 P |
| 3,873,161 | 3/1975 | Kretschmer | |
| 3,876,257 | 4/1975 | Buerger | |
| 3,970,346 | 7/1976 | Kretschmer | |
| 4,003,604 | 1/1977 | Connell | |
| 4,063,783 | 12/1977 | Spisak | |
| 4,093,312 | 6/1978 | Kretschmer | 301/37 R |
| 4,149,754 | 4/1979 | Beisch et al. | 301/37 P |

*Primary Examiner*—H. Grant Skaggs
*Attorney, Agent, or Firm*—Harness, Dickey & Pierce

[57] ABSTRACT

There is disclosed herein a wheel trim retention system for retaining wheel trim on a motor vehicle wheel comprising a slot formed on an axially inwardly facing portion of the wheel trim into which one end of a retention clip is inserted and a second radially outwardly spaced pocket within which the other end of the retention clip is movably disposed. The first end portion includes projections engageable with the sidewalls of the slot so as to restrain the clip against axial movement relative to the wheel trim and the other end is freely movable between radial spaced surfaces. The retention clip includes a biasing portion operative to urge a retention portion into engagement with the vehicle wheel so as to retain the trim member in position thereon.

22 Claims, 10 Drawing Figures

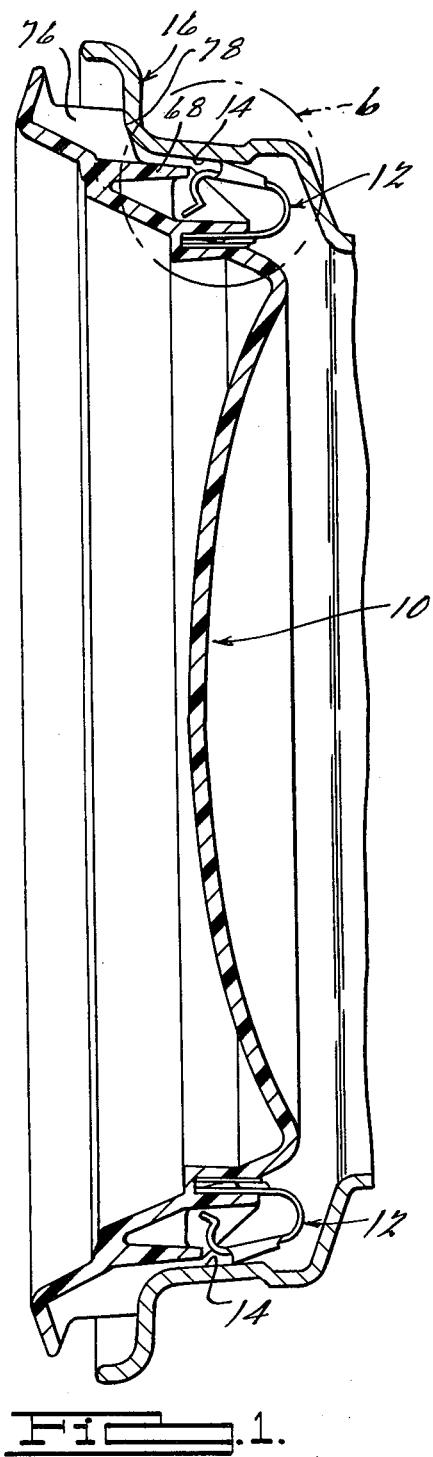
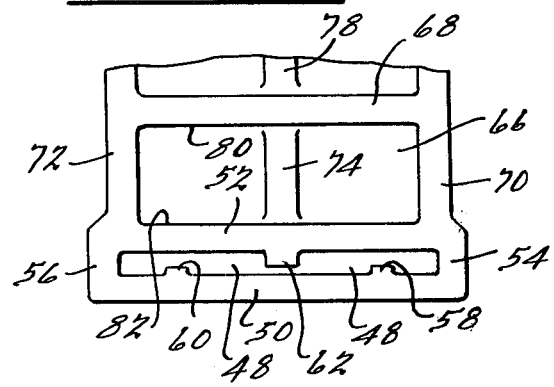
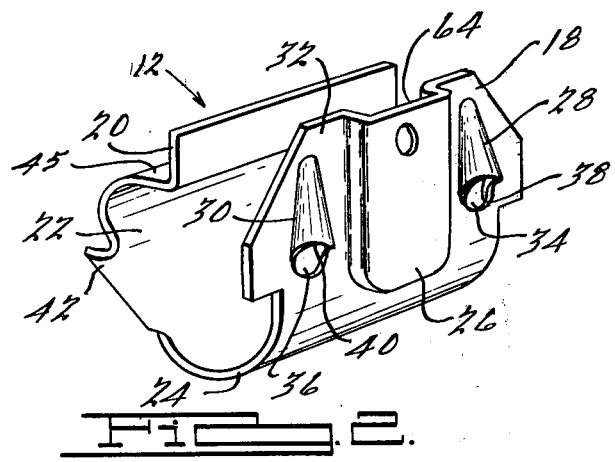
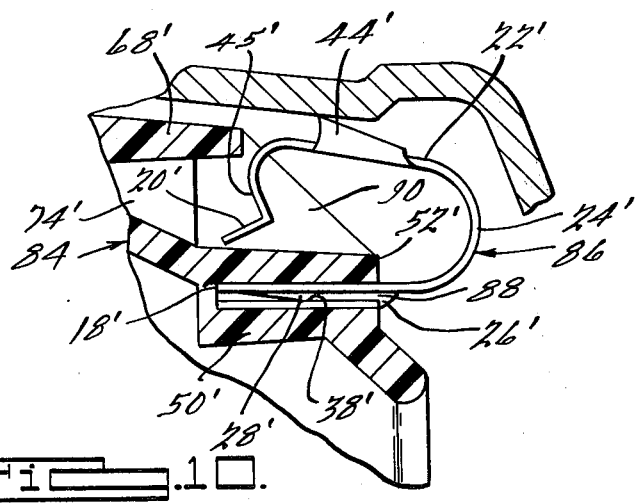

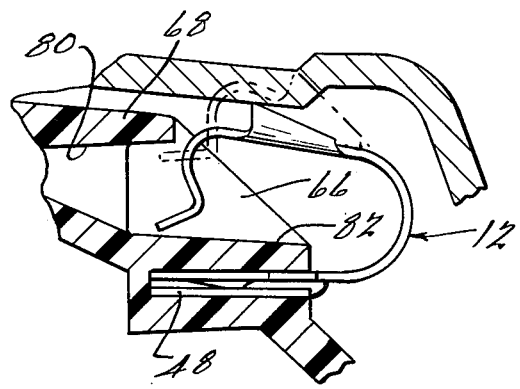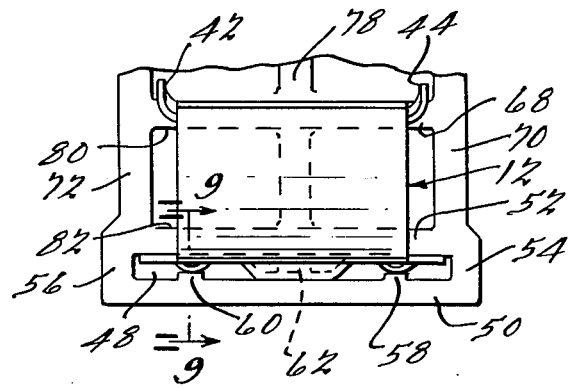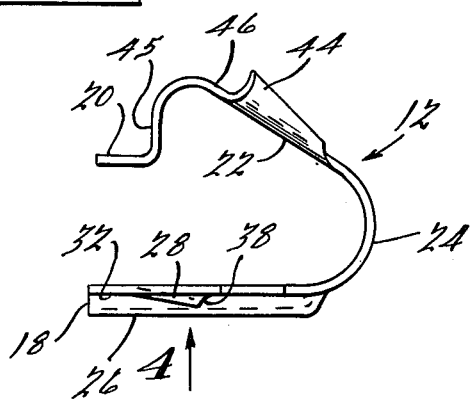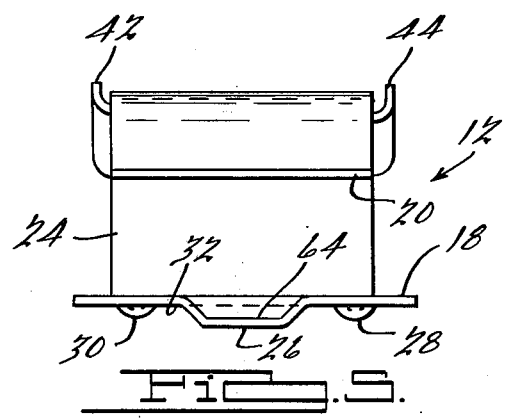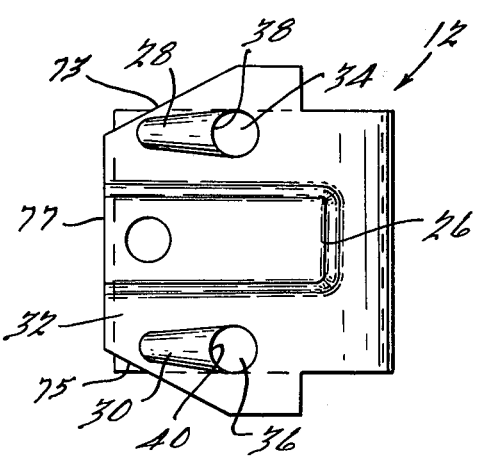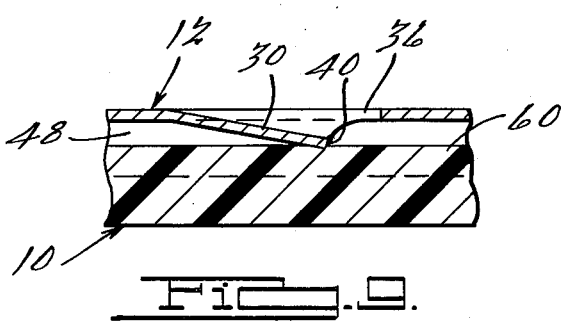

WHEEL TRIM RETENTION SYSTEM

This is a continuation, of application Ser. No. 25,324, filed Mar. 30, 1979 now abandoned.

BACKGROUND AND SUMMARY OF THE INVENTION

The present invention relates generally to wheel trim retention systems and more particularly to such systems which include a plurality of retention clips secured to the periphery of a wheel trim and operative to retain it in position on a vehicle wheel.

Design of wheel trim retention systems requires consideration and balancing of a rather wide and often complex variety of factors and objectives. Of utmost concern is to provide a retention system which will securely retain the trim member on the vehicle wheel throughout the great variety of vibrations, shocks, temperature extremes and the like which the vehicle wheels are commonly subjected to. Also, because the wheel trim and retention means repesents upsprung weight, it is desirable to design such systems to be as light as possible. This weight factor is becoming increasingly important as the automobile manufacturers search for new ways to reduce vehicle weight in order to improve mileage performance. Further, it is necessary to design retention systems which enable the trim member to be easily and repeatedly removed and reinstalled on the wheel by the vehicle owner. It is also important to maintain the cost and complexity of such retention systems to a minimum while still providing a strong lightweight, durable retention system.

Accordingly, the present invention provides a relatively uncomplicated retention system particularly well suited for use with plastic wheel trim and which may be fabricated and assembled at a relatively low cost but yet provides a strong, durable means for retaining the wheel trim on the vehicle wheel. The present retention system comprises a plurality of retention clips each having end portions positioned in generally radially spaced relationship, each of the end portions being received in one of a pair of radially spaced recesses provided on the trim member. One end portion of the clip includes securing means engageable with the sidewall of one of the recesses to retain the clip in assembled relationship to the trim member while the other end portion is movably disposed with the other recess and is engageable with a sidewall portion thereof to increase the retention force exerted on the wheel by the clip in response to relative radial movement of the trim member due to shock forces encountered by the wheel during operation of the vehicle thereby preventing possible loss of the trim member.

Additional advantages and features of the present invention will become apparent from the subsequent description and the appended claims taken in conjunction with the accompanying drawings.

BRIEF DESCRIPTION OF THE DRAWINGS

FIG. 1 is a sectioned view of a wheel trim embodying a retention system in accordance with the present invention, the wheel trim being shown in installed relationship to a portion of a vehicle wheel and the section taken along a radial along a radial plane extending parallel to the axis of rotation;

FIG. 2 is a perspective view of a retention clip in accordance with the present invention;

FIG. 3 is a side elevational view of the retention clip of FIG. 2;

FIG. 4 is an elevational view of the retention clip of FIG. 2 as seen looking in the direction of arrow 4 of FIG. 3;

FIG. 5 is an end view of the retention clip of of FIG. 2;

FIG. 6 is an enlarged view of the portion of FIG. 1 enclosed within circle 6 thereof;

FIG. 7 is a view of the clip receiving process provided on the trim member as seen looking in an axial outward direction;

FIG. 8 is a view similar to that of FIG. 7 but with the retention clip installed within the recesses;

FIG. 9 is a fragmentary sectioned view of the present invention, the section being taken along line 9—9 of FIG. 8; and FIG. 10 is a fragmentary sectioned view of another embodiment of the present invention, the section being taken along a radial plane extending parallel to the axis of rotation.

DESCRIPTION OF THE PREFERRED EMBODIMENTS

Referring now to the drawings and in particular to FIG. 1, there is shown a wheel trim 10 having a retention system in accordance with the present invention including a plurality of retention clips 12 secured to the wheel trim around the periphery thereof. Each of the retention clips engages a generally axially extending flange portion 14 of a conventional multiflanged vehicle wheel 16 so as to retain the trim member in operative relationship thereto.

As best seen with reference to FIGS. 2 through 5, retention clip 12 is formed to an irregular contour generally as shown from a generally elongated strip and includes first and second end portions 18 and 20, a retention portion 22 adjacent second end portion 20 and a spring biasing portion 24 interconnecting the retention portion 22 and first end portion 18.

End portion 18 has a centrally disposed elongated reinforcing embossment 26 provided thereon and a pair of substantially parallel elongated tapered projections 28 and 30 disposed on either side thereof, all of which extend in a generally axial direction. Tapered projections 28 and 30 are substantially identical and taper outwardly away from the plane defined by surface 32 of end portion 18 as well as increasing in transverse width in the direction toward spring portion 24. Openings 34 and 36 are provided in end portion 18 at the inwardly disposed end of each of the protrusions adjacent spring portion 24 and define outwardly projecting terminal edges or end portions 38 and 40 on each of respective protrusions 28 and 30. Preferably, protrusions 28 and 30 will be of substantially the same length and reinforcing embossment 26 will be substantially longer.

Spring portion 24 has a generally arcuate shape and as mentioned above interconnects a relatively straight retention portion 22 with end portion 18. Retention portion 22 includes a pair of integrally formed substantially identical teeth 42 and 44 projecting generally perpendicularly outward from surface portion 46 and disposed on opposite circumferentially spaced side edges thereof.

End portion 20 comprises a relatively short planar portion lying in substantially parallel spaced relationship to end portion 18 when retention clip 12 is in a normally relaxed condition and is connected to retention portion 22 by a generally radially outwardly extending portion 45.

End portion 18 of retention clip 12 is adapted to be received within a generally axially inwardly opening recess or slot 48 provided on wheel trim 10. As best seen with reference to FIG. 7, slot 48 is preferably integrally formed in a portion of wheel trim 10 and is defined by substantially parallel radially spaced inner and outer sidewall portions 50 and 52 and circumferentially spaced end walls 54 and 56. Radially inner sidewall 50 has a pair of axially extending substantially parallel spaced ribs 58 and 60 projecting into slot 48 and disposed adjacent end walls 54 and 56 respectively. Also, radially outer sidewall 52 has a similar axially extending rib 62 projecting into slot 48 and disposed approximately midway between and in substantially parallel relationship to ribs 58 and 60.

Preferably, slot 48 will have a maximum width substantially equal to the width of end portion 18 of retention clip 12 and ribs 58 and 60 will be positioned so as to engage respective protrusions 28 and 30. Rib 62 will also be positioned so as to engage surface 64 of reinforcing embossment 26.

A second recess or pocket 66 is also provided on wheel trim 10 spaced radially outwardly from slot 48 and is defined by radially outer sidewall 52, another axially extending radially outwardly spaced flange portion 68 and circumferentially spaced end walls 70 and 72 which may be in the form of radial extensions of end walls 54 and 56. End walls 54, 56, 70, and 72 operate to provide rigidity and reinforcement to sidewalls 50 and 52 and flange portion 68 and if desired a third radially extending flange portion 74 may also be provided extending between outer sidewall 52 and flange portion 68 approximately midway between end walls 70 and 72. Another radially outwardly extending flange portion 76 is also provided extending from flange portion 68 which operates to impart ridigity to flange portion 68 as well as to provide a locating shoulder 78 to aid in positioning wheel trim 10 with respect to vehicle wheel 16.

It should be noted that while sidewalls 50 and 52 and axially extending flange portion 68 are illustrated as having a width only equal to the width of respective slot 48 and pocket 66 they may also be in the form of continuous annular portions with end walls 54, 56, 70, and 72 being appropriately positioned around the circumference so as to define a plurality of pairs of circumferentially spaced radially aligned slots 48 and pockets 66 of the desired width. It should also be noted that while as illustrated slots 48 and pockets 66 are integrally formed as a part of the wheel trim 10, they may also be formed as a part of an annular retention band to which an ornamental outer covering may be applied should this be desired.

End portion 18 of retention clip 12 is inserted into slot 48 with rib portion 62 being received within the area defined by reinforcing embossment 26. As best seen with reference to FIG. 4, end portion 18 is provided with beveled side edges 73 and 75 which allow the terminal edge 77 thereof to have a reduced width. This reduced width enables end portion 18 to be easily inserted within slot 48 with beveled side edges 73 and 75 engaging sidewalls 54 and/or 56 and acting to guide end portion 18 therein. As shown in FIG. 9, protrusions 28 and 30 will also bitingly engage respective ribs 58 and 60 so as to retain end portion 18 within slot 48.

When end portion 18 has been fully inserted into slot 48, end portion 20 will be movably disposed within radially outwardly spaced pocket 66. As shown in FIG. 6, radially inner surface 80 of flange portion 68 acts as a stop limiting radial outward movement thereof as well as protecting end portion 20 from snagging when the wheel trim is removed from the vehicle wheel. Also, surface 82 of radially outer sidewall 52 acts as a second stop limiting radial inward movement of end portion 20 which engagement may serve to increase the retention force exerted by the engagement of teeth 42 and 44 with vehicle wheel 16 when the trim member is assembled thereto. Thus, should the vehicle wheel be subjected to a sudden shock such as from a pothole in the roadway or the like, relative radial movement of the wheel trim with respect to the vehicle wheel may cause end portion 20 to engage surface 82 and thereby operate to increase the biting engagement between teeth 42 and 44 and wheel 16. It should also be noted that reinforcing embossment 26 is of a length relative to the depth of slot 48 as to extend axially outwardly thereof so as to resist the bending torque exerted on the area adjacent the interconnecting of spring portion 24 and end portion 18 due to the engagement of teeth 42 and 44 with vehicle wheel 16. It should be noted, however, that under normal conditions, end portion 20 will move within pocket 66 without substantial engagement with either surface 80 or 82 and spring portion 24 will be operative to urge teeth 42 and 44 into sufficient engagement with vehicle wheel 16 to retain trim member in operative relationship thereto.

While the present retention system has been described above with regard to application to wheel trim in the form of wheel covers, it is also equally applicable with respect to trim rings. Such an embodiment is illustrated in FIG. 10 comprising a trim ring 84 having a plurality of retention clips 86 secured thereto and shown in installed relationship to a portion of a vehicle wheel. As trim ring 84 includes a plurality of radially spaced slots 88 and pockets 90 which are substantially identical to respective slots 48 and pockets 66 described above, like portions have been indicated by like numerals primed. Similarly, retention clip 86 is also substantially identical to retention clip 12 and accordingly, like portions thereof are indicated by like numerals primed.

Accordingly, the present invention provides a relatively inexpensive retention system particularly well suited for use with wheel trim fabricated from a plastic composition which may be easily and quickly assembled and yet provides a strong durable lightweight retention for the wheel trim. Further, the retention system may be easily adapted for retaining different size or weight wheel trim by merely incorporating more or less retention members around the periphery of the wheel trim.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

I claim:
1. A wheel trim retention system comprising:
a trim member;
means defining an axially inwardly opening slot on said wheel trim;
means defining a generally radially inwardly facing stop surface on said wheel trim, said stop surface being radially outwardly spaced from said slot; and a spring clip having a first end portion disposed within said slot, a second generally axially outwardly projecting end portion extending generally axially outwardly into the space between said slot defining means and said stop surface and being radially movable with respect to said trim member and engageable with said stop surface, said stop surface being operative to limit radial outward movement of said second end portion, wheel engaging retention means intermediate said first and second end portions, and a spring portion adjacent said retention means, said spring portion being operative to bias said retention means into engagement with a vehicle wheel when said trim member is assembled thereto.

2. A wheel trim retention system as set forth in claim 1 wherein said first end portion includes means engageable with portions of said slot to secure said first end portion therein.

3. A wheel trim retention system as set forth in claim 2 wherein said slot is defined by radially inwardly and outwardly spaced sidewalls and said securing means includes a protrusion engageable with one of said sidewalls.

4. A wheel trim retention system as set forth in claim 3 wherein said protrusion includes an edge portion bitingly engaging said one of said sidewalls.

5. A wheel trim retention system as set forth in claim 4 wherein said one of said sidewalls is provided with an axially extending rib, said edge portion engaging said rib.

6. A wheel trim retention system as set forth in claim 5 wherein said protrusion tapers outwardly from a plane defined by said first end portion in an axially inward direction so as to facilitate insertion of said first end portion into said slot.

7. A wheel trim retention system as set forth in claim 6 wherein said edge portion of said protrusion is disposed at the axially inner end thereof and in part defines an opening provided in said first end portion.

8. A wheel trim retention system as set forth in claim 1 wherein said spring portion interconnects said retention member and said first end portion.

9. A wheel trim retention system as set forth in claim 8 wherein said slot is defined by radially inwardly and outwardly spaced sidewalls, and said first end portion includes securing means bitingly engaging one of said sidewalls so as to retain said first end portion within said slot.

10. A wheel trim retention system as set forth in claim 9 wherein said securing means engages said radially inwardly disposed sidewall and said retention means operates to increase the biting engagement between said securing means and said sidewall when said wheel trim is assembled to said wheel.

11. A wheel trim retention system as set forth in claim 1 wherein said slot is defined in part by a radially outer sidewall, said stop means being spaced radially outwardly from said outer sidewall and said second end portion being movable between said stop means and said outer sidewall.

12. A wheel trim retention system as set forth in claim 11 wherein said radially outer sidewall engages said second end portion and cooperates to increase the retention force between said retention means and said wheel in response to radial movement of said wheel trim toward the area of engagement between said retention member and said wheel.

13. A retention clip for use in retaining a plastic wheel trim in overlying relationship to an axially outwardly facing surface of a vehicle wheel, said trim member including means defining an axially inwardly opening slot and means defining a radially outwardly spaced axially inwardly opening pocket, said pocket including a radially inwardly facing stop surface, said retention clip comprising:
a first end portion receivable within said slot, said first end portion including an axially elongated protrusion tapering outwardly from a plane defined by said first end portion and having an edge at the outer end thereof partially defining an opening in said first end portion, said edge being adapted to bitingly engage a portion of said slot so as to retain said clip in assembled relationship with said wheel trim;
a second end portion normally extending in generally the same direction as said first end portion when said clip is in an unstressed condition and disposed in spaced opposed generally parallel relationship to said first end portion and movably receivable within said pocket;
retention means intermediate said end portions; and
a spring portion interconnecting said retention means and one of said first and second end portions, said spring portion being operative to bias said retention means into engagement with a vehicle wheel when said retention clip and an associated trim member are assembled thereto.

14. A retention clip as set forth in claim 13 wherein said first end portion includes an axially extending reinforcing embossment, said embossment operating to prevent bending of said first end portion.

15. A retention clip as set forth in claim 14 wherein said embossment is of a length so as to extend beyond said slot when said first end portion is inserted therein.

16. A wheel trim retention system for retaining a wheel trim in overlying relationship to an axially outwardly facing surface of a vehicle wheel, said retention system comprising:
a trim member;
a plurality of axially inwardly opening slots provided on said wheel trim, each of said slots being defined in part by radially inner and outer spaced sidewalls;
a generally axially inwardly opening pocket associated with each of said slots and spaced radially outwardly therefrom, said pocket being defined by said outer sidewall and a radially outwardly spaced stop surface;
a plurality of retention clips, each of said clips having a first end portion disposed within respective of said slots and a second end portion extending generally axially outwardly into respective of said pockets, said second end portions being movable between said stop surfaces and said outer sidewalls, said stop surfaces being operative to limit radially outward movement of said second end portions;
securing means for retaining said first end portion within said slot and
retention means provided on said retention clip intermediate said first and second end portions, said retention means being engageable with said vehicle wheel so as to retain said wheel trim in position thereon.

17. A wheel trim retention system as set forth in claim 16 wherein each of said retention clips includes a spring portion interconnecting said retention means and said first end portion, said spring portion being operative to bias said second end portion radially outwardly and said stop surface being operative to limit radial outward movement thereof.

18. A wheel trim retention system as set forth in claim 16 wherein said radially outer sidewall includes a surface engageable with said second end portion in response to relative radial movement of said wheel trim with respect to said vehicle, said surface being operative to increase the retention force exerted by said retention means on said vehicle wheel.

19. A wheel trim retention system as set forth in claim 16 wherein said second end portion is normally spaced from said surface when said wheel trim is assembled to a vehicle wheel.

20. A wheel trim retention system as set forth in claim 18 wherein said securing means comprises a pair of spaced substantially parallel axially elongated radially tapered protrusions, each of said protrusions having an edge portion which in part defines an opening provided in said first end portion, said edges bitingly engaging one of said radially inner and outer sidewalls.

21. A wheel trim retention system as set forth in claim 16 wherein said first end portion further includes an axially elongated reinforcing embossment disposed between said protrusions, said embossment having a length so as to extend axially inwardly from said slot and being operative to prevent bending of said first end portion.

22. A wheel trim retention system as set forth in claim 20 wherein said retention means comprises a pair of tooth members extending generally radially outwardly from opposite edges of said retention clip.

* * * * *